United States Patent [19]

Pham et al.

[11] Patent Number: 5,121,281
[45] Date of Patent: Jun. 9, 1992

[54] HIGH TENSION DC CURRENT-LIMITING CIRCUIT BREAKER

[75] Inventors: Van Doan Pham, Meyzieu; Michel Collet, Villeurbanne; Mohamed Bekhaled, Bavilliers; Thierry Verhaege, Saulx les Chartreux, all of France

[73] Assignee: GEC Alsthom SA, Paris, France

[21] Appl. No.: 625,194

[22] Filed: Dec. 10, 1990

[30] Foreign Application Priority Data

Dec. 8, 1989 [FR] France .................. 89 16252

[51] Int. Cl.⁵ ............................. H02H 9/02
[52] U.S. Cl. ........................... 361/19; 361/58; 361/141; 505/850
[58] Field of Search .......... 361/3, 4, 8, 9, 10, 361/13, 19, 58, 141; 505/850

[56] References Cited

U.S. PATENT DOCUMENTS

| | | | |
|---|---|---|---|
| 3,691,491 | 9/1972 | Massar | 361/19 |
| 4,172,268 | 10/1979 | Yanabu | 361/8 |
| 4,578,730 | 3/1986 | Tokuyama | 361/8 |
| 4,740,858 | 4/1988 | Yamaguchi | 361/4 |
| 4,805,062 | 2/1989 | Shirouzu | 361/4 |
| 4,910,626 | 3/1990 | Collet | 361/19 |

FOREIGN PATENT DOCUMENTS

| | | |
|---|---|---|
| 1565993 | 3/1970 | Fed. Rep. of Germany . |
| 2410148 | 9/1975 | Fed. Rep. of Germany . |
| 3734989 | 4/1988 | Fed. Rep. of Germany . |
| 2073731 | 9/1971 | France . |
| 2102793 | 4/1972 | France . |

OTHER PUBLICATIONS

IEEE Transactions on Power Apparatus and Systems, vol. 104, No. 9, Sep. 1985, N.Y., USA, pp. 2460–2466; B. Bachman: "Development of a 500 kV Airblast HVDC Circuit Breaker".

*Primary Examiner*—Steven L. Stephan
*Assistant Examiner*—Adolf Berhane
*Attorney, Agent, or Firm*—Sughrue, Mion, Zinn, Macpeak & Seas

[57] ABSTRACT

The invention relates to a circuit breaker for limiting a direct current and comprising a combination of first means including superconducting windings for limiting the current and second means for interrupting the residual current. The invention is applicable to interrupting high tension direct currents.

4 Claims, 4 Drawing Sheets

HIGH TENSION DC CURRENT-LIMITING CIRCUIT BREAKER

The invention relates to a high tension current-limiting circuit breaker for interrupting direct currents.

BACKGROUND OF THE INVENTION

Interrupting high tension direct current is a difficult problem.

An object of the invention is to provide apparatus capable of solving this problem reliably and cheaply.

The principle on which the present invention is based comprises the combination of first means known per se for limiting the value of the current to be interrupted and then enabling second means, also known per se to be applied to finally interrupt the residual current.

The first means are constituted, for example, by those described in Document FR-A-2 073 731, and comprise a superconducting winding for limiting a fault current to a nominal current value by the winding switching to the normal conductivity state. The Document mentions that the residual current is interrupted by a power circuit breaker. This is easy with alternating current, but very difficult with direct current.

That is why, the present invention proposes associating said first means with second means such as those described in the document IEEE Transactions on Power Apparatus and Systems, PIS 104 1985, September 9 "Development of a 500 kV airblast HVDC circuit breaker" by B. Bachman, G. Mauthe, E. Ruoss, and H.P. Lips. These second means comprise a series-resonant circuit capable of injecting an oscillating current into the circuit, thereby generating zero crossings in the current to be interrupted. The novel and original combination of the invention makes it possible to interrupt currents of several thousand amps at tensions of about 100 kV.

SUMMARY OF THE INVENTION

The invention thus provides a direct current limiting circuit breaker for insertion between two points of a DC line, the circuit breaker comprising first means for limiting the value of the current and second means for interrupting the residual current, said first means comprising a superconducting coil placed in a cryostat, said coil being constituted by at least two windings wound in opposite directions, one of said windings being connected in series with a switch, and a low resistance resistor being connected to the terminals of said switch, wherein said second means comprise, in series with said coil, a circuit breaker whose terminals are connected to a varistor and to a circuit comprising a capacitor and an inductor connected in series.

In another embodiment, the direct current limiting circuit breaker for insertion between two points of a direct current line and comprising first means for limiting the current and second means for interrupting the residual current, said first means comprising a superconducting coil placed in a cryostat, said coil being constituted by at least one set of two windings wound in opposite directions, one of said windings being connected in series with a switch, and a low resistance resistor being connected to the terminals of said switch, wherein said second means comprise, in series with said coil, a circuit breaker and, in parallel with said circuit breaker, a circuit comprising in series a make switch, an inductor and a capacitor, with a resistor connecting the common point between the inductor and the capacitor to ground.

Advantageously, balancing resistors disposed outside the cryostat are connected in series with each of the superconducting coils.

A varistor is connected between said two line points or to the terminals of the current limiting means.

BRIEF DESCRIPTION OF THE DRAWINGS

Embodiments of the invention are described by way of example with reference to the accompanying drawings, in which.

DETAILED DESCRIPTION

Figure 1:
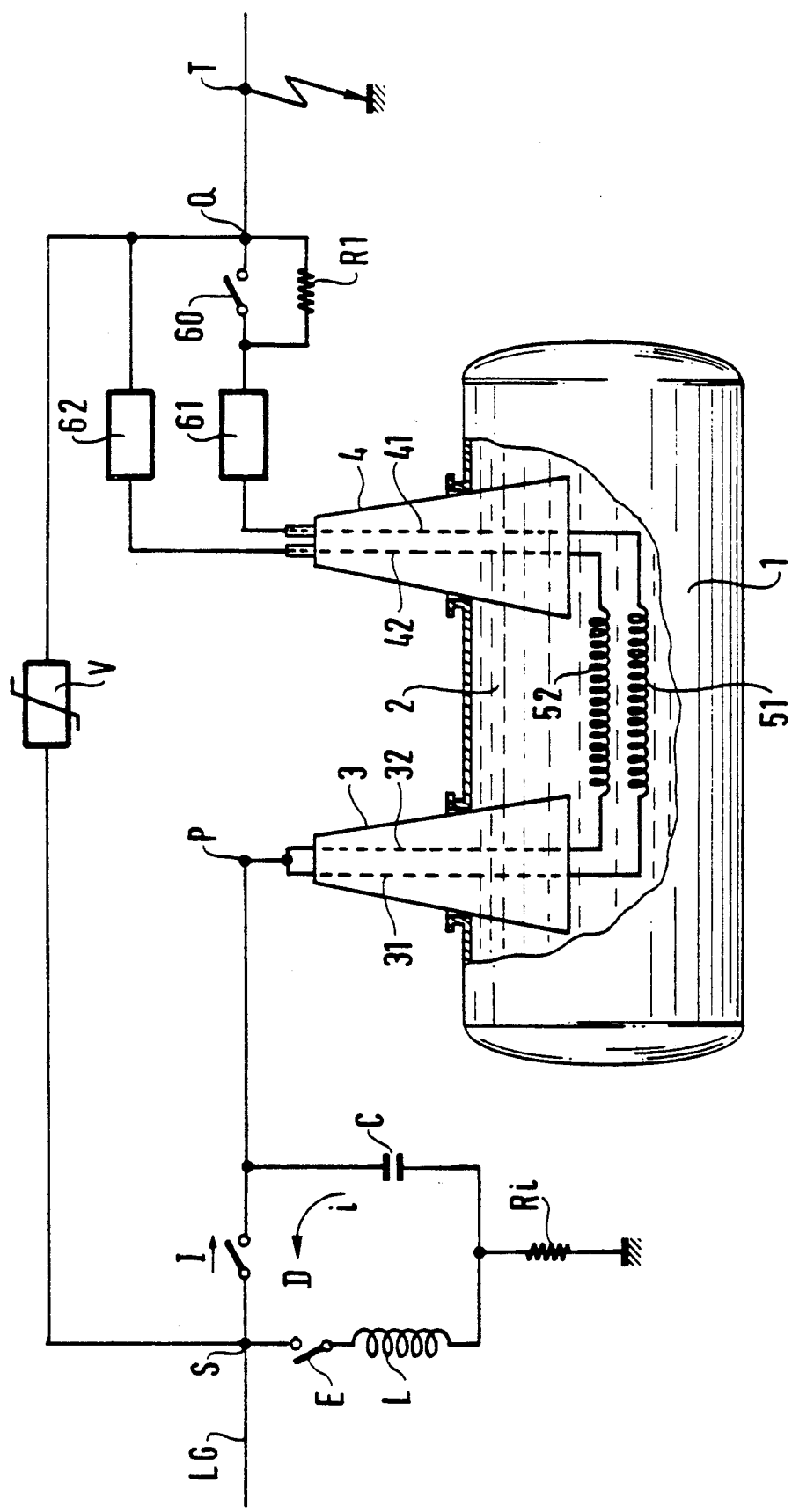
FIG. 1 is a diagrammatic view of a first embodiment of a DC current-limiting circuit breaker of the invention.

In FIG. 1, reference LG designates a DC line between two points S and Q having a current-limiting circuit breaker of the invention inserted therebetween.

This circuit breaker comprises two series of means:

first means for limiting the value of the current, which current may, for example, be a high value fault current or the nominal line current of the line; and second means for interrupting the residual current that remains after the above-mentioned current-limiting has taken place.

The current-limiting means comprise a cryostat 1 having a cryogenic fluid 2 disposed therein suitable for making two windings 51 and 52 superconducting. To clarify the drawing, these windings are shown as being side by side, but in fact they are coaxial and wound in opposite directions in order to reduce the value of their inductance.

The cyrostat has two feedthroughs 3 and 4. The windings 51 and 52 are connected firstly to conductors 31 and 32 interconnected at a point P at the outlet from the feedthrough 3, and secondly to conductors 41 and 42 which pass through the feedthrough 4 and which are interconnected at point Q.

A switch 60 outside the cyrostat is disposed in series with one of the windings, in this case the winding 51, and a high resistance resistor R1 is connected across the terminals of the switch 60.

Low resistance resistors 61 and 62 are connected in series with respective ones of the windings 51 and 52 and serve to balance the impedances of the two branches so as to obtain good current distribution between the windings 51 and 52.

The second means for interrupting the residual current comprise a circuit breaker D inserted between the points S and P.

The terminals of the circuit breaker D are connected to a circuit comprising the following components connected in series: a make switch E, an inductor L, and a capacitor C which is permanently charged by the line LG.

A very high resistance resistor Ri connects the common point between the inductor and the capacitor to ground.

Finally, a varistor V interconnects points S and Q.

The operation of the apparatus is now described.

In normal operation, the circuit breaker D and the switch 60 are closed, while the make switch E remains open.

Interrupting fault current

If a ground fault occurs, e.g. at point T, then the fault current increases very quickly, and very quickly exceeds the critical current for the superconducting wires. The windings 51 and 52 switch automatically to the non-superconducting state (this is an auto transition), and they become electrically resistive.

Immediately, the voltage at S rises quickly, and the surge due to the electromagnetic energy of the network ($\frac{1}{2}L_0I_0^2$) is transformed into electrostatic energy ($\frac{1}{2}C_0U_0^2$).

The varistor V has its operating tension adjusted to 1.1 U or 1.2 U (where U is the nominal tension of the network) and therefore conducts, absorbing a large portion of this energy.

The remaining portion of this energy is absorbed by the windings 51 and 52.

This surge lasts for a few milliseconds. After these transient conditions, the tension U applied to the windings 51 and 52 gives rise to a residual current Ir, e.g. of the order of 100 amps.

About 20 ms after the transition or after the fault, the circuit breaker D is opened and an arc is established between its contacts. A few milliseconds later, the make switch E is closed.

Figure 2:
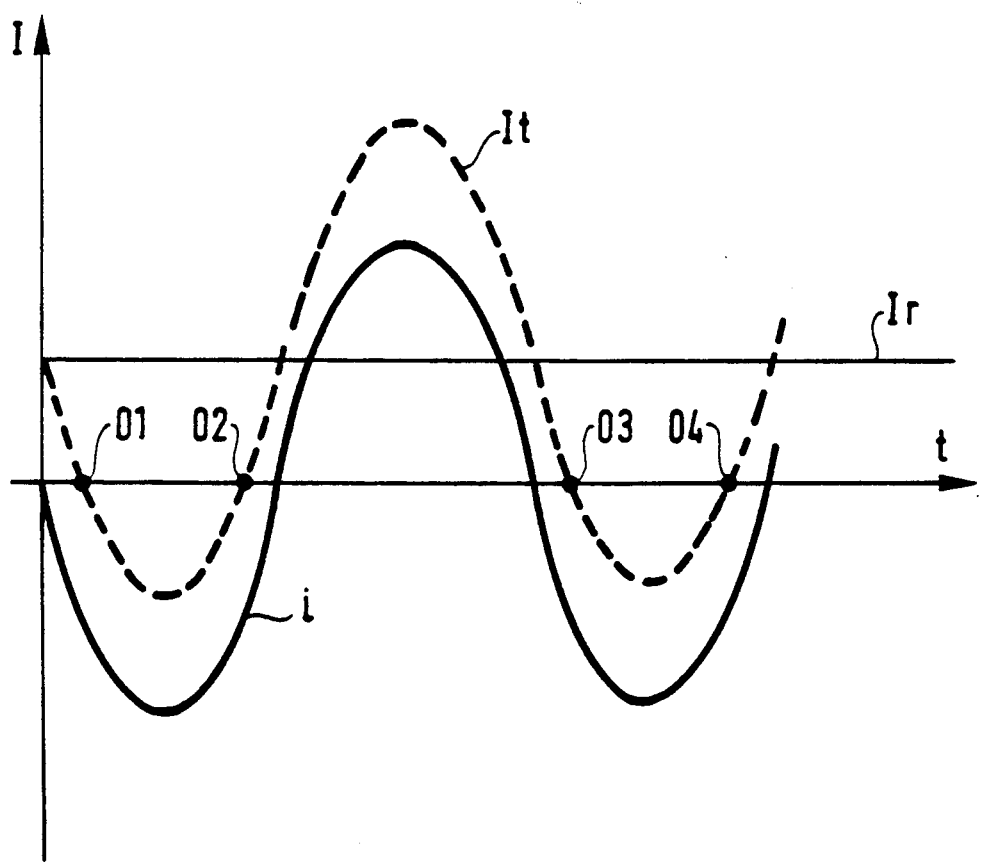
FIG. 2 is a waveform diagram explaining one mode of operating the current-limiting circuit breaker of the invention for interrupting residual current.

The electrically charged capacitor C then injects an oscillating current i of amplitude greater than Ir via the circuit breaker D and the inductor L. This oscillating current i is superposed on the residual current Ir, thereby establishing zero crossings in the resultant current It (see FIG. 2) at 01, 02, 03, 04, . . . This greatly facilitates current interruption by the circuit breaker D.

If the surge is small on interrupting at D, it would be possible to put the varistor V between points P and Q instead of between points S and Q.

Interrupting nominal currents or current less than the critical current

A method is used whereby the windings 51 and 52 change state in succession.

When switch 60 is opened, an arc is established which unbalances current distribution between the windings 51 and 52. As a result the winding 52 is subjected to transition first by its current exceeding the critical value, after which the other winding 51 is subjected to transition.

Consider an example: let the nominal current to be interrupted be In, and assume that the value of the critical current Ic is equal to 1.5 In.

Assume that the current is distributed 50%-50% between the windings, and that the critical current in each winding is Ic/2.

By opening the switch 60, In tends to pass through the winding 52, and since In is greater than Ic/2, winding 52 switches from the superconducting state to the normal state. All of the current In then tends to pass through winding 51, and it changes state in turn.

When winding 51 changes state, there is a surge across the terminals of the circuit and the varistor V comes into operation.

Immediately after the switch 60 is opened, the circuit breaker D is opened, and then the make switch E is closed to inject the current i into the circuit breaker D.

The time the residual current flows though the windings 51 and 52 is smaller in this case than in the preceding case, giving rise to lower cryogenic losses.

This method used with two superconducting windings can ensure that transitions occur for permanent currents that are not less than Ic/2.

In a variant, four superconducting windings can be used instead of two, thereby it making it possible to achieve transitions for permanent currents that are as low as Ic/4.

Figure 3:
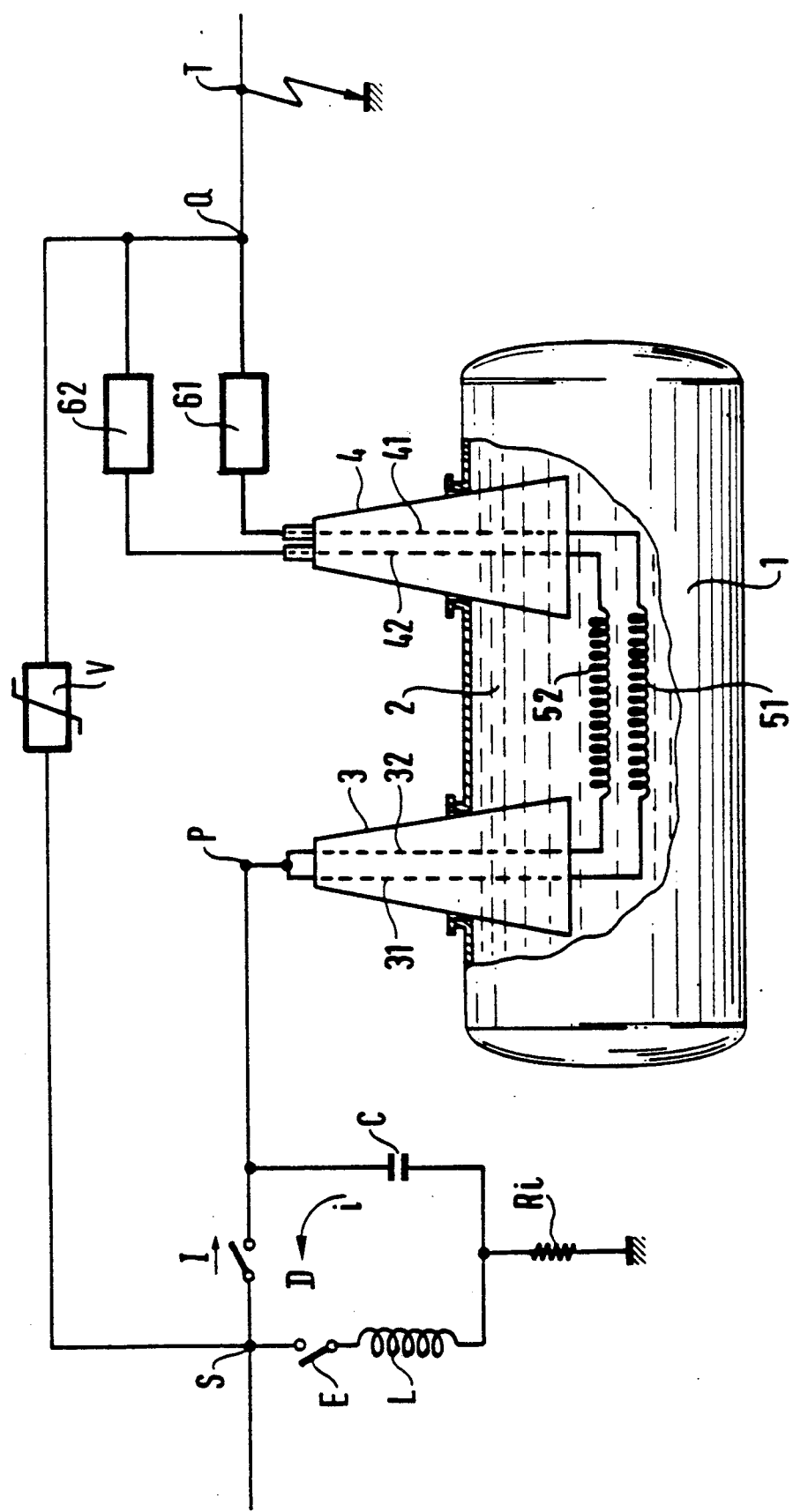
FIG. 3 is a diagram of a first variant embodiment of a current-limiting circuit breaker.

FIG. 3 shows a variant embodiment of the limiting circuit breaker of the invention.

Items which are common to FIGS. 1 and 3 are given the same reference numerals.

This circuit differs from that of FIG. 1 in that the switch 60 and the resistor R1 are omitted.

Operation in the event of a fault is identical to that described above: the windings 51 and 52 change state, and then the current i is injected.

When interrupting currents lower than the critical value Ic, operation is likewise the same.

In this variant, it may be observed that it is necessary for the injected current i to be slightly greater than Ic; and this means that the capacitance of capacitor C must be very much greater.

For example, assume that in the first case an injected current i of 0.25 Ic was required, then in the second case a current i = Ic is required. This requires a capacitance which is 16 times greater since the capacitance ratio varies with the square of the current ratio.

Figure 4:
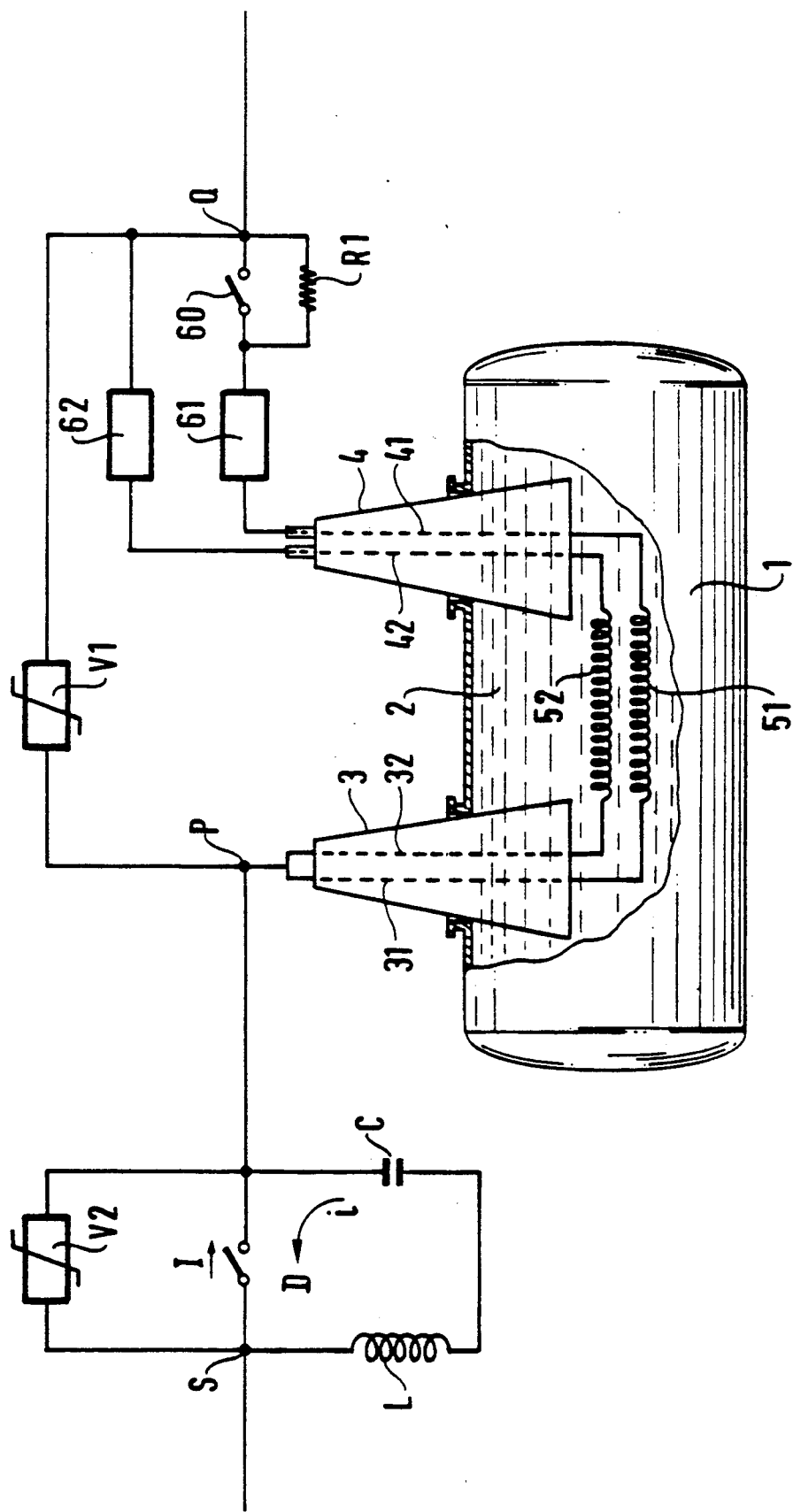
FIG. 4 is a diagram of a second variant of a current-limiting circuit breaker.

FIG. 4 shows a variant embodiment which differs from that of FIG. 1 in that the make switch E and the resistor Ri have been omitted. In addition, a varistor V1 is connected between the points P and Q and another varistor V2 is connected to the terminals of the circuit breaker D.

Once the windings have changed state, there remains the residual current Ir to be interrupted.

The principle used this time for interrupting the residual current relies on the negative characteristic of the arc.

This arc makes it possible to amplify the current i opposing Ir until a zero crossing is obtained in the resulting current flowing through the circuit breaker D.

After interruption has taken place in the circuit breaker D, the current Ir is transferred to the circuit LC. When the voltage across the terminals of C reaches a sufficient value, the varistor V2 operates. The current Ir is then transferred through the varistor V2 which absorbs the electromagnetic energy of the circuit. This causes Ir to be extinguished. This principle is described in IEEE, Vol. PAS 104, No. 10, October 1985, "High voltage direct current circuit breaker development and field tests".

The values required for the various components of the apparatus whose various embodiments are described above can easily be calculated.

The values of L, C, and the frequency f of the injected current i are determined as a function of Ic, Ir, i, and the interrupting power of the circuit breaker D.

For example, in FIG. 1:

U = 100 kV, Ic = 2,500 A, i = 3,150 A, C = 10 microfarads, L = 0.01 henries, f = 500 Hz.

The invention is applicable to interrupting high tension direct currents.

We claim:

1. A direct current limiting circuit breaker for insertion between two points of a DC line, the circuit breaker comprising first means for limiting the value of the current and second means for interrupting the residual current, said first means comprising a superconducting coil placed in a cryostat, said coil being constituted by at least two windings wound in opposite directions, one of said windings being connected in series with a switch, and a low resistance resistor being connected across the terminals of said switch, wherein said second means comprise, in series with said coil, a circuit breaker whose terminals are connected to a varistor and to a circuit comprising a capacitor and an inductor connected in series, wherein balancing resistors are disposed outside the cryostat and are connected, respectively in series with each of said superconducting coils, and wherein said varistor is connected between said two points of said line.

2. A direct current limiting circuit breaker for insertion between two points of a direct current line, the circuit breaker comprising first means for limiting the current and second means for interrupting the residual current, said first means comprising a superconducting coil placed in a cryostat, said coil being constituted by at least one set of two windings wound in opposite directions, one of said windings being connected in series with a switch, and a low resistance resistor being connected across the terminals of said switch, wherein said second means comprise, in series with said coil, a circuit breaker and, in parallel with said circuit breaker, a circuit comprising in series a make switch, an inductor and a capacitor, with a resistor connecting the common point between the inductor and a capacitor to ground, wherein balancing resistors are disposed outside the cryostat and are connected in series, respectively, with each of the superconducting coils, and wherein a varistor is connected between said two points of the line.

3. A direct current limiting circuit breaker for insertion between two points of a DC line, the circuit breaker comprising first means for limiting the value of the current and second means for interrupting the residual current, said first means comprising a superconducting coil placed in a cryostat, said coil being constituted by at least two windings wound in opposite directions, one of said windings being connected in series with a switch, and a low resistance resistor being connected across the terminals of said switch, wherein said second means comprise, in series with said coil, a circuit breaker whose terminals are connected to a varistor and to a circuit comprising a capacitor and an inductor connected in series, wherein balancing resistors are disposed outside the cryostat and are connected, respectively in series with each of said superconducting coils, and wherein a varistor is connected across the terminals of the current limiting means.

4. A direct current limiting circuit breaker for insertion between two points of a direct current line, the circuit breaker comprising first means for limiting the current and second means for interrupting the residual current, said first means comprising a superconducting coil placed in a cryostat, said coil being constituted by at least one set of two windings wound in opposite directions, one of said windings being connected in series with a switch, and a low resistance resistor being connected across the terminals of said switch, wherein said second means comprise, in series with said coil, a circuit breaker and, in parallel with said circuit breaker, a circuit comprising in series a make switch, an inductor and a capacitor, with a resistor connecting the common point between the inductor and a capacitor to ground, wherein balancing resistors are disposed outside the cryostat and are connected in series, respectively, with each of the superconducting coils, and wherein a varistor is connected across the terminals of the current limiting means.

* * * * *